(12) United States Patent
Semancik et al.

(10) Patent No.: US 6,963,993 B1
(45) Date of Patent: Nov. 8, 2005

(54) FAIL-OVER FILE TRANSFER PROCESS

(75) Inventors: Susan K. Semancik, Snow Hill, MD (US); Annette M. Conger, Snow Hill, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 398 days.

(21) Appl. No.: 09/965,248

(22) Filed: Sep. 28, 2001

Related U.S. Application Data

(60) Provisional application No. 60/235,912, filed on Sep. 28, 2000.

(51) Int. Cl.[7] .............................................. G06F 11/00
(52) U.S. Cl. ........................ 714/2; 714/749; 709/232
(58) Field of Search ................................ 714/1, 2, 3, 4, 714/748, 749; 709/232

(56) References Cited

U.S. PATENT DOCUMENTS

| | | | |
|---|---|---|---|
| 4,642,758 A | 2/1987 | Teng | |
| 5,060,140 A | 10/1991 | Brown et al. | |
| 5,124,991 A * | 6/1992 | Allen | 714/748 |
| 5,553,083 A * | 9/1996 | Miller | 714/748 |
| 5,813,007 A | 9/1998 | Nielsen | |
| 5,903,566 A | 5/1999 | Flammer, III | |
| 6,023,223 A | 2/2000 | Baxter, Jr. | |
| 6,073,180 A | 6/2000 | Onoda et al. | |
| 6,125,454 A * | 9/2000 | Mossner et al. | 714/4 |
| 6,148,410 A | 11/2000 | Baskey et al. | |
| 6,230,194 B1 | 5/2001 | Frailong et al. | |
| 6,249,894 B1 * | 6/2001 | Lin et al. | 714/748 |
| 6,272,547 B1 | 8/2001 | McWilliams | |
| 6,615,383 B1 * | 9/2003 | Talluri et al. | 714/749 |
| 6,665,278 B2 * | 12/2003 | Grayson | 370/328 |
| 6,741,554 B2 * | 5/2004 | D'Amico et al. | 370/225 |

OTHER PUBLICATIONS

Windows NT 4 download dialog box, 1994-1998, Microsoft Corporation.*

* cited by examiner

Primary Examiner—Robert Beausoliel
Assistant Examiner—Marc Duncan
(74) Attorney, Agent, or Firm—Bryan Geurts

(57) ABSTRACT

The present invention provides a fail-over file transfer process to handle data file transfer when the transfer is unsuccessful in order to avoid unnecessary network congestion and enhance reliability in an automated data file transfer system. If a file cannot be delivered after attempting to send the file to a receiver up to a preset number of times, and the receiver has indicated the availability of other backup receiving locations, then the file delivery is automatically attempted to one of the backup receiving locations up to the preset number of times. Failure of the file transfer to one of the backup receiving locations results in a failure notification being sent to the receiver, and the receiver may retrieve the file from the location indicated in the failure notification when ready.

22 Claims, 4 Drawing Sheets

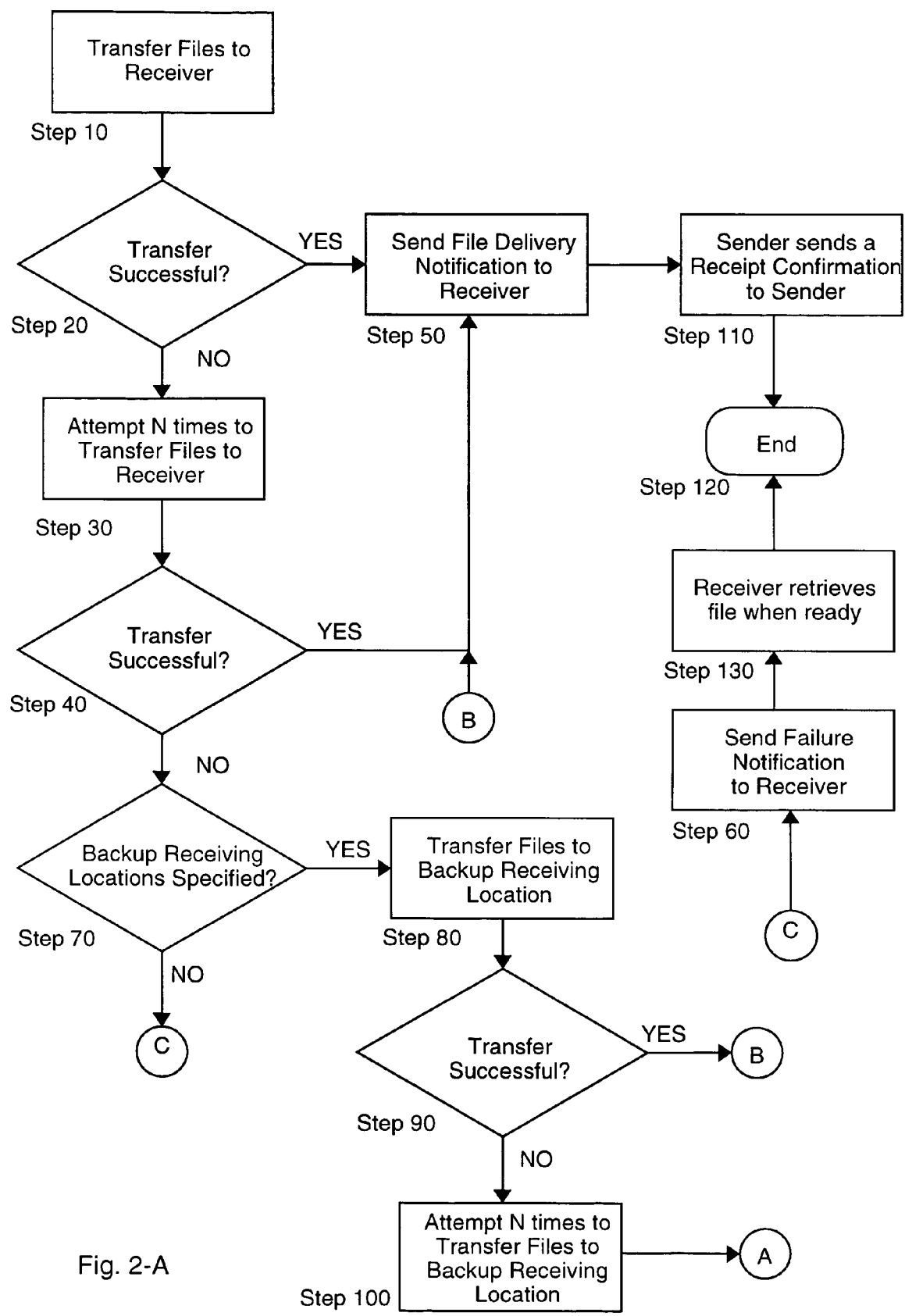
Fig. 2-A

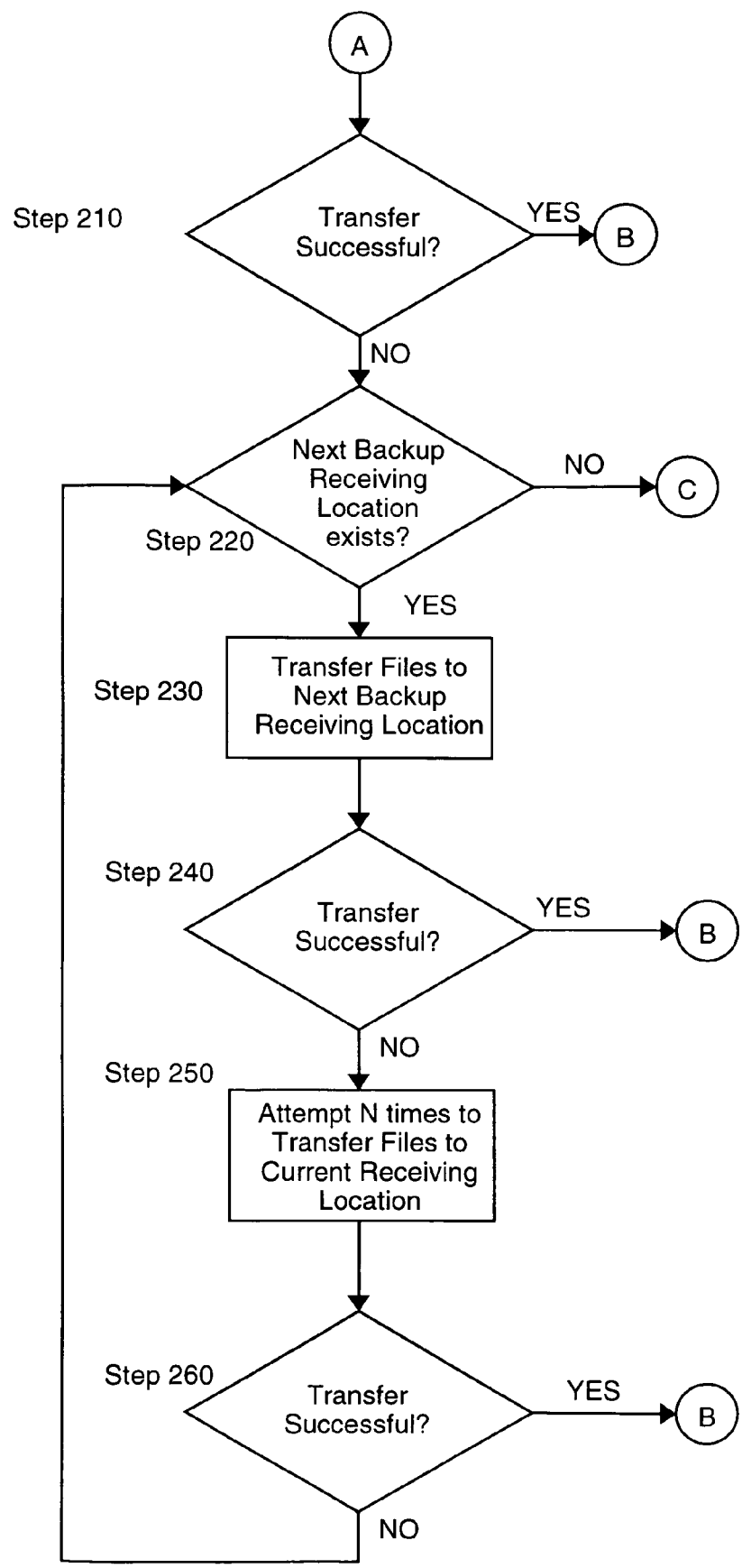
Fig. 2-B

007

FAIL-OVER FILE TRANSFER PROCESS

CROSS-REFERENCES TO RELATED APPLICATIONS

This application now formalizes and incorporates herein by reference Provisional Application Ser. No. 60/235,912, "Standard Autonomous File Server (SAFS)" Susan K. Semancik et al., filed on Sep. 28, 2000. Applicant claims the priority date thereof under 35 U.S.C. 119(e).

ORIGIN OF THE INVENTION

The invention described herein was made by employees of the United States Government. The invention may be manufactured and used by or for the governmental purposes without the payment of royalties thereon or therefor.

FIELD OF THE INVENTION

The present invention relates to file transfer systems, and more particularly, to a method of handling transfer failure occurring while transferring a series of data files from one computer to another computer.

BACKGROUND OF THE INVENTION

Automated data file transfer systems are utilized in various networks and communication systems. The purpose of this automation is to deliver data files to clients without interfering with acquisition of the data.

The automated data file transfer involves a data transfer network wherein a number of computers are interconnected and each computer, server or client, is a node in the network wherein data files are transferred through the network using established network protocols. File transfers are initiated in response to a pre-arranged client's request which can be handled only when the data transfer resources are available. Each node in the network has one or more data transfer facilities which form the network interface at the node. These facilities include hardware and software and the number of active facilities affects network congestion and affects the availability of computer resources at each of the nodes.

When transferring files from one computer to another computer, e.g. server to client, it is desirable to do so in a manner which guarantees reliable delivery of the files. Unsuccessful transfer attempts unnecessarily add to network congestion and may interfere with other transfers. This adds to the expense of the network and degrades network performance.

SUMMARY OF THE INVENTION

The present invention provides a fail-over file transfer process to handle data file transfer and to avoid unnecessary network congestion when the transfer is unsuccessful, enhancing reliability in the automated data file transfer system. The fail-over file transfer process operates in the following manners:

Prior to the fail-over file transfer operation, a receiver may specify backup receiving locations and number of attempts to be made before sending a failure notification and/or attempting another backup receiving location. The number of attempts may also be specified by the sender. If the receiver desires to receive a file from a sender at one of the backup receiving locations in case of transfer failure, it must specify the locations in advance so that the file delivered to one of the backup receiving locations can be retrieved when ready.

If it is determined a requested file has not been delivered to the receiver, the sender will attempt to send the file to the receiver up to the preset number of times. If attempting to send the file to a receiver up to the preset number of times, and the receiver has indicated the availability of other backup receiving locations, then the file delivery is automatically attempted to one of the backup receiving locations up to the preset number of times. Failure of the file transfer to one of the backup receiving locations results in a failure notification being sent to the receiver, and the receiver may retrieve the file from the sender's location when ready. If the file transfer is completed successfully, a file delivery notification will be sent to the receiver. In return, the receiver sends to the sender a receipt confirmation notification with a success or error status. Both failure notification and file delivery notification may be sent via email or World Wide Web (WWW).

The following is a list of prior-issued patents related to file transfer, repeated attempts to transfer files, file transfer to backup destinations, and transfer status notification:

| | | |
|---|---|---|
| 4,642,758 | 2/87 | Teng |
| 5,060,140 | 10/91 | Brown et al. |
| 5,813,007 | 9/98 | Nielsen |
| 6,073,180 | 6/00 | Onoda et al. |
| 6,148,410 | 11/00 | Baskey et al. |
| 6,230,194 | 5/01 | Frailong et al. |
| 6,272,547 | 8/01 | McWilliams |

DESCRIPTION OF DRAWINGS

FIG. 2 is a flow chart of fail-over file transfer process.

DETAILED DESCRIPTION OF PREFERRED EMBODIMENT OF THE INVENTION

Figure 1:
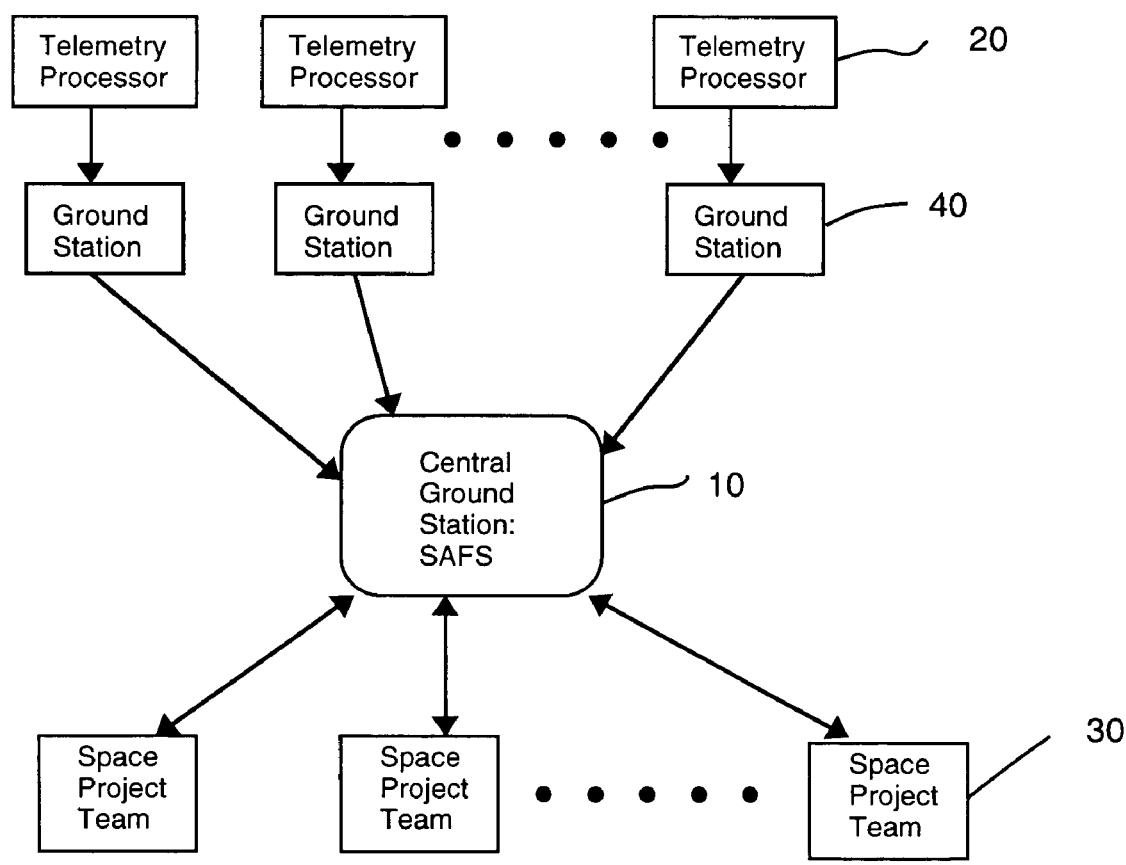
FIG. 1 is a diagram of a network wherein Standard Autonomous File Server (SAFS) is implemented.

FIG. 1 shows an embodiment of the invention using Standard Autonomous File Server 10 that provides management of large data files without interfering with acquisition of the data. (See http://ww1.wff.nasa.gov/~websafs) It operates as a stand-alone solution, monitoring itself, and providing automated level of fail-over processing to enhance reliability. By using an improved automated file transfer process, the SAFS 10 system provides a quicker, more reliable file distribution for customers 30 of near real-time data than has been realized by previous methods. In addition, when overlapping supports occur in multiple projects, provision is made for file transfer prioritization by bandwidth sharing or transfer interruption methods. Web reporting provides current status of system availability, file latency, and customer file distribution.

The operational design for network support incorporates distributed SAFS systems at ground stations on closed networks for file acquisition from telemetry processors (TMP) 20, and a centralized SAFS 10 at NASA Goddard Space Flight Center (GSFC) on open networks for file distribution to project customers. The Central SAFS provides a single point of contact for customers 30 and isolates the ground stations from customer interactions. At each ground station 40, multiple TMP's 20 supporting multiple antennas and/or multiple projects, acquire downlinked satellite data that is processed into files and sent to the ground station 40 SAFS as shown in FIG. 1. Each of these SAFS systems uses commercial off-the-shelf (COTS) software to automatically send these files to the central SAFS, where they are made available to each project's customers 30. (See http://www.softlinkusa.com)

Customers 30 can receive a file from the SAFS 10 system once they receive a data ready notification (DRN) of its availability. If they are also using the same COTS product as the SAFS 10 system the data file can automatically be sent to them, thereby eliminating the delay inherent in the notification and reaction processes required for receiving customers. Customers are emailed a file delivery notification (FDN) with transfer status upon completion of the file transfer to them. Both FDN and DRN notices contain the file's name, size, and its SAFS location.

FIG. 2 describes the operation of the fail-over file transfer process.

In response to a pre-arranged request from the receiver, the sender will attempt to send a requested file to the receiver. (Step 10) If the file transfer is successful (Step 20) the sender sends to the receiver a file delivery notification that includes name, size, origin, and location of the file, for example via email or World Wide Web (WWW). (Step 50) In return, the receiver sends to the sender a receipt confirmation notification with a success or error status. (Step 110)

If the sender determines that its attempt to transfer the file is not successful (Step 20) it will attempt to send the file to the receiver up to a preset number of times. (Step 30) The number of attempts will be specified, for example, by the receiver or sender prior to the operation.

If attempting to send the file to the receiver up to the preset number of times fails, the sender sends to the receiver a failure notification that includes failure status and name, size, and location of the file so that the receiver can retrieve it when ready. (Step 60 & 130) The failure notification may also be sent via email and WWW.

Further, if the receiver has specified a backup receiving location prior to the operation, (Step 70) the sender may send the file to the backup receiving location. (Step 80) Once the file is successfully transferred to the backup receiving location the sender sends to the receiver a file delivery notification that includes name, size, and origin of the file via email or World Wide Web (WWW). (Step 50) In return, the receiver sends to the sender a receipt confirmation notification with a success or error status. (Step 110)

If the sender determines that its attempt to transfer the file to the backup receiving location is not successful (Step 90) it will attempt to send the file to the backup receiving location up to a preset number of times. (Step 100) The number of attempts will be specified by the receiver or sender prior to the operation.

If attempting to send the file to the backup receiving location up to the preset number of times fails, (Step 210) the sender sends to the receiver a failure notification that includes failure status and name, size, and location of the file so that the receiver can retrieve it when ready. (Step 60 & 130) The failure notification may also be sent via email and WWW.

If the receiver has specified other backup receiving locations prior to the operation, (Step 220) the sender may send the file to one of other backup receiving locations. (Step 230) The sequence of selecting one of the other backup receiving locations will be predetermined by the receiver.

Once the file is successfully transferred to one of the other backup receiving locations the sender sends to the receiver a file delivery notification that includes name, size, origin, and location of the file via email or World Wide Web (WWW). (Step 50) In return, the receiver sends to the sender a receipt confirmation notification with a success or error status. (Step 110)

If the sender determines that its attempt to transfer the file to one of the other backup receiving locations is not successful (Step 240) it will attempt to send the file to one of the other backup receiving locations up to a preset number of times. (Step 250) The number of attempts will be specified by the receiver or sender prior to the operation.

If attempting to send the file to one of the other backup receiving locations up to the preset number of times fails, (Step 260) the sender sends to the receiver a failure notification that includes failure status and name, size, and location of the file so that the receiver can retrieve it when ready. (Step 60 & 130) The failure notification may also be sent via email and World Wide Web (WWW).

The sender continues to perform the steps 220 through 260 until the file is successfully transferred to one of backup receiving locations.

If the file is not delivered to any of the backup receiving locations, the sender sends to the receiver a failure notification that includes failure status and name, size, and location of the file so that the receiver can retrieve it when ready. (Step 60 & 130) The failure notification may also be sent via email and World Wide Web (WWW).

Figure 3:
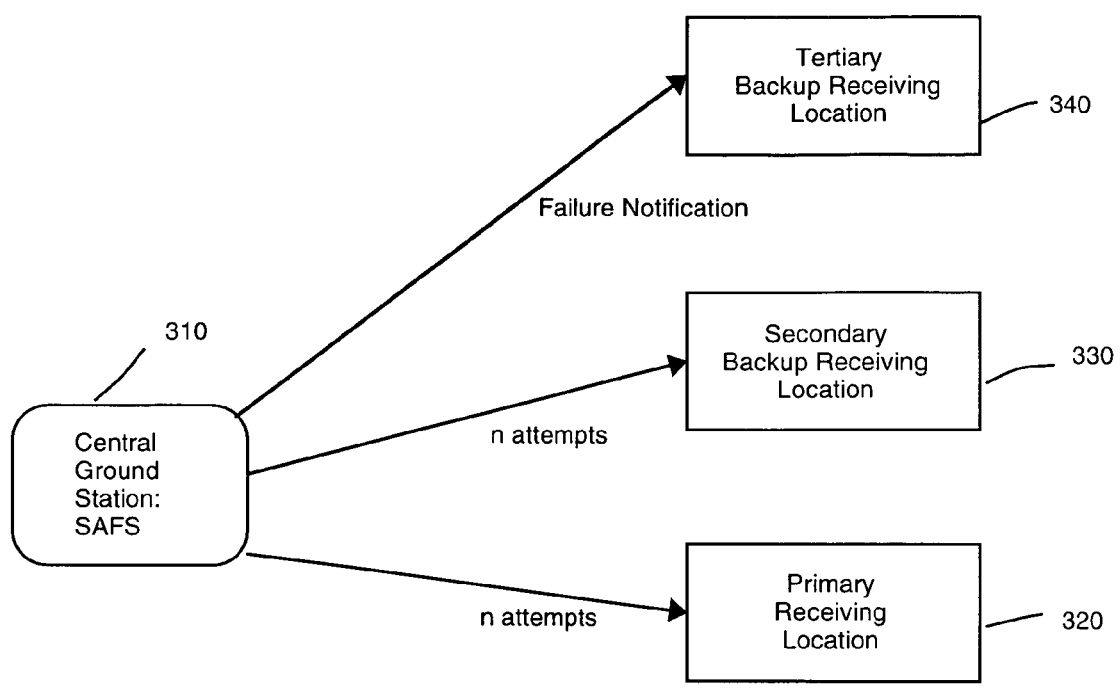
FIG. 3 is a diagram of one embodiment of the fail-over file transfer process implemented in the SAFS.

FIG. 3 describes one embodiment of the fail-over file transfer. Upon failure to deliver a file to a receiver 320, the server 310 sends an FDN email to the receiver 320 with a failure status so that the receiver 320 can retrieve the file when ready during the project-specified retention period. If a file cannot be delivered after three attempts, and the receiver 320 has indicated the availability of secondary backup receiving location 330, then the file delivery is automatically attempted to the secondary backup receiving location 330 at least three times. Failure of the file transfer to the secondary backup receiving location 330 results in a failure FDN being sent to the receiver's tertiary backup receiving location 340, and the receiver 320 is expected to retrieve the file when ready.

What is claimed is:

1. A method in a computer system for transferring a file to another computer comprising:
    sending a file to a receiver;
    determining whether the file has been successfully transferred to the receiver;
    if the file has not been successfullly transferred to the receiver, attempting to send the file to the receiver up to a preset number of times;
    sending the file to a backup receiving location if attempting to send the file to the receiver up to the preset number of times fails;
    determining whether the file has been successfully transferred to the backup receiving location; and
    if the file has not been successfully transferred to the backup receiving location, attempting to send the file to the backup receiving location up to a preset number of times;
    wherein the identification of said backup receiving location is predetermined by the receiver.

2. The method as in claim 1 further comprising:
    sending a file delivery notification if the file is successfully sent to the receiver.

3. The method as in claim 2 wherein said file delivery notice comprises:
  name of said file;
  size of said file;
  origin of said file; and
  location of said file.

4. The method as in claim 2 wherein the file delivery notification is sent to the receiver via email or World Wide Web (WWW).

5. The method as in claim 1 further comprising:
  sending a failure notification to the receiver if attempting to send the file up to the preset number of times fails.

6. The method as in claim 5 wherein said failure notification comprises:
  failure status;
  name of the file;
  size of the file; and
  location of the file.

7. The method as in claim 5 wherein the failure notification is sent to the receiver via email or World Wide Web (WWW).

8. The method as in claim 1 further comprising:
  sending a file delivery notification if the file is successfully sent to the receiver.

9. The method as in claim 8 wherein said file delivery notice comprises:
  name of said file;
  size of said file;
  origin of said file; and
  location of said file.

10. The method as in claim 8 wherein the file delivery notification is sent to the receiver via email or World Wide Web (WWW).

11. The method as in claim 1 further comprising:
  if the file is not delivered to the backup receiving location, sending a failure notification to the receiver.

12. The method as in claim 11 wherein said failure notification comprises:
  failure status;
  name of the file;
  size of the file; and
  location of the file.

13. The method as in claim 11 wherein the failure notification is sent to the receiver via email or World Wide Web (WWW).

14. The method as in claim 1 further comprising:
  if attempting to send the file to the backup receiving location up to the preset number of times fails
  (a) sending the file to a next backup receiving location;
  (b) determining whether the file has been successfully transferred to the next backup receiving location; and
  (c) if the file has not been successfully transferred to the next backup receiving location, attempting to send the file to the next backup receiving location up to a preset number of times.

15. The method as in claim 14 further comprising:
  sending a file delivery notification if the file is successfully sent to the receiver.

16. The method as in claim 15 wherein said file delivery notice comprises:
  name of said file;
  size of said file;
  origin of said file; and
  location of said file.

17. The method as in claim 15 wherein the file delivery notification is sent to the receiver via email or World Wide Web (WWW).

18. The method as in claim 14 further comprising:
  continuing to perform the steps (a) through (c) until the file is successfully transferred to one of next backup receiving locations.

19. The method as in claim 18 further comprising:
  if the file is not delivered to any of the backup receiving locations, sending a failure notification to the receiver.

20. The method as in claim 19 wherein said failure notification comprises:
  failure status;
  name of the file;
  size of the file; and
  location of the file.

21. The method as in claim 19 wherein the failure notification is sent to the receiver via email or World Wide Web (WWW).

22. A method in a computer system for transferring a file to another computer comprising:
  sending a file to a receiver;
  determining whether the file has been successfully transferred to the receiver;
  if the file has not been successfully transferred to the receiver, attempting to send the file to the receiver up to a preset number of times;
  sending the file to a backup receiving location if attempting to send the file to the receiver up to the preset number of times fails and the backup receiving location exists;
  determining whether the file has been successfully transferred to the backup receiving location; and
  if the file has not been successfully transferred to the first backup receiving location, attempting to send the file to the first backup receiving location up to a preset number of times;
  wherein identification of said backup receiving location is predetermined by the receiver.

* * * * *